United States Patent
Khan et al.

(10) Patent No.: US 11,131,465 B2
(45) Date of Patent: Sep. 28, 2021

(54) VACUUM STEAM HEATING SYSTEM

(71) Applicant: "Energy of vacuum" Limited Liability Company, Moscow (RU)

(72) Inventors: Anton Viktorovich Khan, Taraz (KZ); Igor Wu-Yunovich Van, Moscow (RU); Lyubov Viktorovna Khan, Taraz (KZ); Viktor Konstantinovich Khan, Taraz (KZ)

(73) Assignee: "Energy of Vacuum" Limited Liability Company

( * ) Notice: Subject to any disclaimer, the term of this patent is extended or adjusted under 35 U.S.C. 154(b) by 137 days.

(21) Appl. No.: 16/097,742

(22) PCT Filed: Jan. 30, 2017

(86) PCT No.: PCT/RU2017/000042
§ 371 (c)(1),
(2) Date: Oct. 30, 2018

(87) PCT Pub. No.: WO2017/146608
PCT Pub. Date: Aug. 31, 2017

(65) Prior Publication Data
US 2019/0154274 A1 May 23, 2019

(30) Foreign Application Priority Data
Feb. 24, 2016 (RU) .......................... RU2016106130

(51) Int. Cl.
*F24D 19/10* (2006.01)
*F24D 19/08* (2006.01)
(Continued)

(52) U.S. Cl.
CPC .......... *F24D 19/1003* (2013.01); *F24D 1/00* (2013.01); *F24D 1/02* (2013.01); *F24D 1/08* (2013.01);
(Continued)

(58) Field of Classification Search
CPC ...... F24D 19/1003; F24D 1/02; F24D 19/081; F24H 1/0009
(Continued)

(56) References Cited

U.S. PATENT DOCUMENTS 708,101 A * 9/1902 Wade ................... B01F 3/04808
261/19
781,767 A * 2/1905 Collis ....................... F24D 1/00
237/9 R
(Continued)

FOREIGN PATENT DOCUMENTS

CN 2088213 U 11/1991
CN 1067107 A 12/1992
(Continued)

OTHER PUBLICATIONS

International Search Report from PCT/RU2017/000042 dated Aug. 3, 2017.
(Continued)

*Primary Examiner* — Kenneth J Hansen
*Assistant Examiner* — Phillip Decker
(74) *Attorney, Agent, or Firm* — Law Office of Oliver Edwards LLC; Oliver Edwards

(57) ABSTRACT

The vacuum steam heating system relates to the field of heat power, and specifically to energy saving technologies and is intended for autonomous heating of residential, public, industrial buildings and greenhouses, livestock farms, etc. In order to achieve the high-efficiency transfer of a thermal flow from a source of thermal energy, a vacuum steam method of heat transfer is used in conjunction of a closed evaporation-condensation cycle having a high rate of molar heat transfer via steam, with separate subsystems of condensate return and vacuum-creation and rarification control within the system, with the possibility of installing a heat (Continued)

supply point in a basement variant, floor-mounted variant and roof variant. The system reliability is achieved via the safe and uninterrupted operation, including in the presence of unsatisfactory levels of the system air-tightness (prior to eliminating leaks). The system efficiency reaches 89%, with 38% energy-carrier conservation.

2 Claims, 1 Drawing Sheet

(51) Int. Cl.
| | | |
|---|---|---|
| *F24D 1/02* | (2006.01) | |
| *F24D 1/00* | (2006.01) | |
| *F24D 1/08* | (2006.01) | |
| *F24H 1/00* | (2006.01) | |

(52) U.S. Cl.
CPC ......... *F24D 19/081* (2013.01); *F24H 1/0009* (2013.01); *Y02B 30/00* (2013.01); *Y02P 80/10* (2015.11)

(58) Field of Classification Search
USPC .......................................................... 237/9 R
See application file for complete search history.

(56) References Cited

U.S. PATENT DOCUMENTS

| 874,112 | A | * | 12/1907 | Peck | F24D 1/00 237/9 R |
|---|---|---|---|---|---|
| 874,113 | A | * | 12/1907 | Peck | F24D 1/00 237/67 |
| 927,591 | A | * | 7/1909 | Peck | F24D 1/00 237/9 R |
| 929,800 | A | * | 8/1909 | Sparks | F24D 1/00 237/9 R |
| 1,071,214 | A | * | 8/1913 | Crowley | F22D 11/06 417/107 |
| 1,075,490 | A | * | 10/1913 | Osbourn | F24D 1/00 237/12 |
| 1,096,941 | A | * | 5/1914 | Osbourn | G05D 23/185 236/86 |
| 1,304,106 | A | | 5/1919 | Serrell | |
| 1,364,139 | A | * | 1/1921 | Perry | F24D 19/081 237/68 |
| 1,548,224 | A | * | 8/1925 | Thomsen | F24D 1/00 237/9 R |
| 1,910,237 | A | * | 1/1929 | Cadwell | F24D 19/081 137/198 |
| 1,771,077 | A | | 7/1930 | Dunham | |
| 1,946,676 | A | | 2/1934 | Vincent | |
| 1,965,708 | A | * | 7/1934 | McCabe | F24D 1/00 237/9 R |
| 2,186,680 | A | * | 1/1940 | Lavergne | F24D 1/00 237/9 R |
| 2,534,826 | A | * | 12/1950 | McKinnon | F24D 1/00 237/9 R |
| 2,898,049 | A | * | 8/1959 | Parkton | F24D 1/00 237/9 R |
| 3,377,994 | A | * | 4/1968 | Horne | F22D 11/006 122/382 |
| 3,661,325 | A | * | 5/1972 | Altenstadt | F24H 1/50 237/8 R |
| 4,398,663 | A | * | 8/1983 | Hegberg | F24D 19/1003 236/37 |
| 5,173,155 | A | * | 12/1992 | Miyata | B01D 3/10 159/DIG. 16 |
| 5,189,392 | A | * | 2/1993 | Kass | F23N 3/085 340/521 |
| 8,702,013 | B2 | | 4/2014 | Zhadanovsky | |
| 9,027,846 | B2 | * | 5/2015 | Zhadanovsky | F01K 17/02 237/16 |
| 2011/0198406 | A1 | | 8/2011 | Zhadanovsky | |
| 2015/0076241 | A1 | | 3/2015 | Zhadanovsky | |

FOREIGN PATENT DOCUMENTS

| GB | 334035 | A | * | 8/1930 | ........... F24D 19/081 |
|---|---|---|---|---|---|
| JP | 2002081606 | A | | 3/2002 | |
| KZ | 18932 | A | | 11/2007 | |
| RU | 2016354 | C1 | | 7/1994 | |
| RU | 2195608 | C1 | | 12/2002 | |
| UA | 89954 | U | | 5/2014 | |
| WO | 2012093310 | A2 | | 7/2012 | |
| WO | 2016085829 | A1 | | 6/2016 | |

OTHER PUBLICATIONS

English Abstract for UA89954 retrieved on Espacenet on Oct. 26, 2018.
English Abstract for KZ18932 (machine translation), Nov. 15, 2007.
Korean Intellectual Property Office, Notification of Reason for Refusal re application 10-2018-7027936, dated Apr. 27, 2020 and machine generated English translation, KR.
European Patent Office, Supplementary European search report and European search opinion re application EP3339748, dated Oct. 1, 2018, Munich, DE.
Eurasian Patent Organization, Office Communication re Patentability of Invention re application 201891912/31, dated Aug. 28, 2019, Moscow, RU.
Canadian Intellectual Property Office, Examiner Requisition re application 3,022,680, dated Apr. 29, 2020, Quebec, CA.
Canadian Intellectual Property Office, Examiner Requisition re application 3,022,680, dated Dec. 21, 2020, Quebec, CA.
Canadian Intellectual Property Office, Examiner Requisition re application 3,022,680, dated Jul. 25, 2019, Quebec, CA.
State Intellectual Property Office, Notice of First Review Opinion re application 201710103481.2, dated Jan. 29, 2019, Beijing, CN.
State Intellectual Property Office, Notice of Second Review Opinion re application 201710103481.2, dated Oct. 28, 2019, Beijing, CN.

* cited by examiner

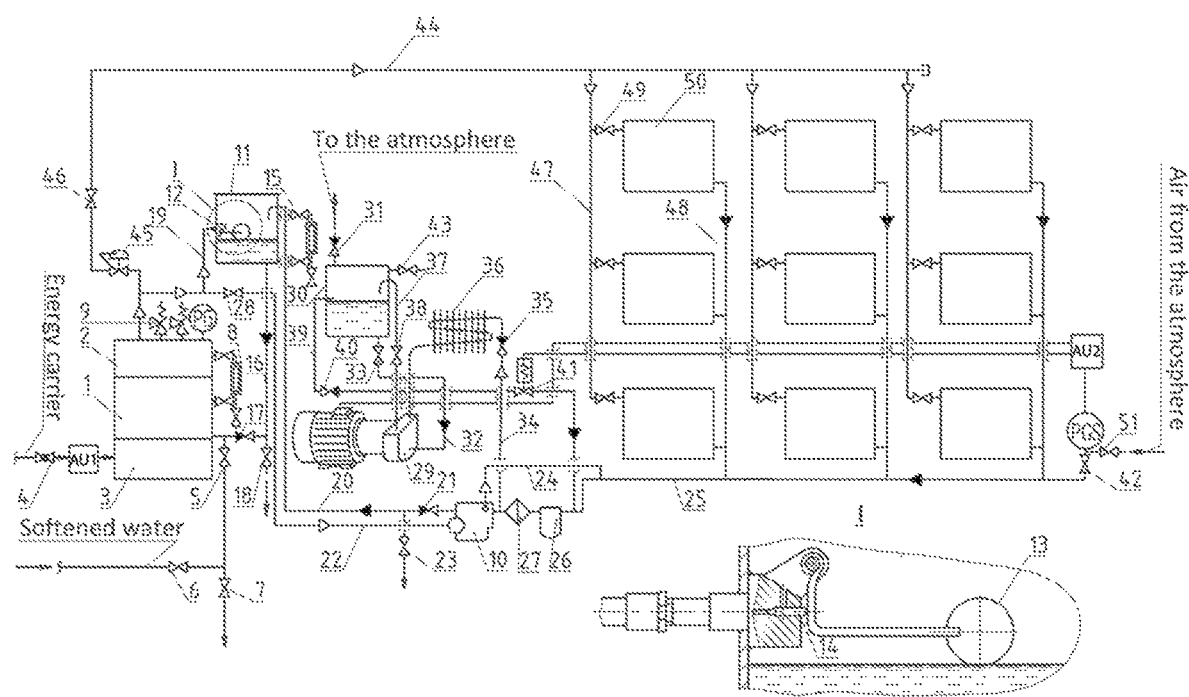

VACUUM STEAM HEATING SYSTEM

FIELD OF THE TECHNOLOGY

The invention relates to the field of heat power, and specifically to energy saving technologies.

BACKGROUND

There is known the vacuum steam system, including: a boiler with a steam collector, heating devices connected by means of taps with a steam pipe, a steam trap with a condensate pipe and a device for creating vacuum (Patent of the Russian Federation No. 2195608, F24D 1/00 dated 27 Dec. 2002). This system is characterized by the high metal content and a high probability of loss of air-tightness. The system does not provide for control of the energy carrier consumption and explosion safety of the boiler.

There is known the installation for heating by vacuum steam (the primary source is the publication, posted on the Internet, web-site: ngpedia. ru/id427980p1.html "Vacuum steam system. Large Encyclopaedia of Oil and Gas"). The installation includes: a steam boiler, a distribution line, risers for steam supply, heating devices, condensate drain pipes, a filter, a vacuum pump, an air separator. The disadvantage of this system is the continuously operating vacuum pump that consumes a significant amount of electrical power, connected in series to a steam boiler through the air separator. The high probability of cavitation due to the fact that the pump in this system is pumping steam and hot condensate in addition to air, the air separator at the time of air removal into the atmosphere does not effectively return the condensate to the steam boiler in the presence of excessive pressure inside, and when the absolute pressure in the boiler is less than the atmospheric pressure, there is a high probability of sucking of outside air into the boiler. The system of explosion safety of the boiler is not provided for.

The closest analogue is the well-known vacuum steam system (the primary source is P. N. Kamenev, A. N. Skanavi, V. N. Bogoslavsky "Heating and ventilation, part 1" Moscow, Stroyizdat, 1975), which scheme of the device includes: a steam boiler, a steam-condensate piping connection with heating devices, steam traps, a condensate tank, a system parameter control device, a water-packed ring pump to create vacuum and to transfer condensate. The disadvantages of this system are a high probability of loss of air-tightness through the sealing devices of the vacuum liquid-ring pump, as well as the inability to regulate the pressure of the various vacuum values by the membrane pressure regulator, since when using this regulator, switching on and off the pump will only be for one specific value of the specified rarification value; readjustment will be required for another rarification value of the regulator. If the vacuum liquid-ring pump is disconnected for an indefinite time, the condensate will not be fed into the boiler, since the pump is connected to the boiler in series. The pump should work constantly consuming a significant amount of electrical power. Limitation of the heat supply point arrangement with a steam boiler only in the basement due to limitation of the condensate return to the boiler when the steam is back-pressured by the header pressure in the discharge line of the vacuum pump.

SUMMARY

A vacuum steam heating system with parallel subsystems of condensate return and rarification control within the system is intended for transferring thermal flow from the heat energy source to consumers and serves for autonomous heat supply of residential, public and industrial buildings, greenhouses, livestock farms, etc.

In order to achieve the high-efficiency transfer of a thermal flow, a vacuum steam method is used based on a closed evaporation-condensation cycle operation with a high rate of molar heat transfer via steam.

The vacuum steam method of heat transfer is carried out by a system including:
a steam boiler equipped with a unit of automatic control and blocking of energy carrier supply (AU1), devices for visual monitoring of the water level in the boiler and the steam pressure (PG) in the steam collector, and safety valves ensuring the safety of the boiler operation. Here, the upper distribution steam pipe is positioned horizontally and the condensate pipe with a mechanical pumping condensate trap to the condensate collection tank and further to the boiler, vertical spreading steam supply steam pipes into the piping connections of the heating devices, a vacuum liquid-ring pump to create initial rarification and ensure a qualitative control of the coolant temperature by varying the depth of the vacuum in the system by means of automatic control of the pump operation. The high efficiency of this system is achieved through minimum energy costs when transferring the thermal flow from the heat source to consumers, the centralized qualitative and quantitative control of the steam consumption, which is provided by the unit of automatic control and blocking of the energy carrier supply (AU1) and the rarification control subsystem.

The uninterrupted and stable operation of this vacuum steam heating system during running is ensured by an independent subsystem of condensate return to the boiler through a mechanical pumping condensate trap (condensate pump), and maintenance and control of rarification in the system by the vacuum-creation subsystem through the system of automatic control (AU2) of the vacuum liquid-ring pump.

The object of the invention is to create a heating system with efficient use of energy carrier (natural gas, electricity, etc.), use of low-cost materials, reliable and safe operation, creating conditions for easy installation, simplicity in maintenance and operation and the possibility of arranging the steam boiler in basement variant, floor-mounted variant and roof variant.

The technical result is that the transfer of thermal flow is carried out by a vacuum steam method based on superconductivity of thermal energy with a high heat transfer coefficient from a heat source to consumers through a closed pipeline circulation system (steam pipes and condensate pipes). The use of a vacuum steam heat transfer method allows to reduce energy consumption by reducing the costs for transferring heat energy to the heating system of the premises, excluding the boost pumps for feeding the coolant, such as in a water heating system with high hydrostatic pressure. Low-cost materials (low-carbon steel pipes, metal-plastic pipes, conventional fittings, shut-off steam fittings, etc.) are applicable for the coolant transportation device (vacuumed steam). All this is due to the introduction into the system of an intermittent vacuum liquid-ring pump with an automatic control system (AU2), depending on the system condition and the set rarification parameters, which maximally removes dissolved air in the intermediate coolant (water, antifreeze) at the system start-up, with a coolant temperature not exceeding 96° C. The introduction of the automatic energy coolant supply control unit (AU1) to the steam boiler allows for central quantitative control of the coolant (steam) consumption, and the system of energy carrier supply blocking and filling the boiler with the estimated strictly dosed amount of the intermediate coolant ensures explosion safety of the boiler. A small volume of filling with the intermediate coolant also allows reducing the energy carrier's expenses for rapid warming up of the intermediate coolant in the boiler, thus leading to significant savings in water resources. The use of a condensate return subsystem in a steam boiler makes it possible to arrange a heat supply point in basement variant, floor-mounted variant and roof variant, since mechanical pumping condensate trap can create a backup pressure depending on the pressure developed by the steam boiler of the working steam up to 16 MPa.

It should be noted that the compressed air from the compressor receiver can be used as a operating medium for the pumping of condensate. The ability of the pumping condenser trap to transport the condensate to a higher level makes it possible to locate the heat supply point in basement variant, floor-mounted variant and roof variant.

BRIEF DESCRIPTION OF THE DRAWINGS

FIG. 1 shows a scheme of the vacuum steam heating system with parallel subsystems of the condensate return to the boiler and for vacuum-creation of the system.

DETAILED DESCRIPTION OF THE NON-LIMITING EMBODIMENTS OF THE TECHNOLOGY

The vacuum steam heating system consists (see FIG. 1) of the following subsystems: steam, condensate return to the boiler, vacuum-creation and qualitative steam temperature control, premise heating.

A steam subsystem includes: steam boiler 1, steam collector 2, furnace volume 3, plug valve 4, boiler water makeup valve 5, soft water pipeline tap 6, drain valve of steam subsystem 7, boiler water level indicator 8, safety valves 9, unit of automatic fuel supply and blocking (AU1) in case of interruption in the supply of energy carrier and vacuum gauge (PG) for visual monitoring of the pressure-rarification in the subsystem.

The subsystem of condensate return in the boiler includes: mechanical pumping condensate trap (condensate pump) 10, condensate collection tank 11 equipped with a float valve for supplying steam from the boiler 12 comprising float device 13, needle valve 14 and indicator of condensate level in the tank 15, pipeline of condensate supply to the boiler 16, check valve 17, drain tap 18, pipeline of steam supply from the boiler 19 (for balancing the back pressure in the pipeline of condensate supply to the boiler), pipeline of condensate supply 20, check valve 21, pipeline of steam supply to the condensate trap 22, drain tap 23, exhaust pipeline of the exhausted working steam 24, central condensate pipe 25, sludge pan 26, strainer filter 27 and tap 28 of supplying working steam.

The subsystem of vacuum-creation and qualitative control includes: vacuum liquid-ring pump 29, air separator 30 equipped with check valve 31, pipeline of water supply for forming a water ring in the pump 32, tap 33, suction pipeline of air from the system 34, check valve 35, cooler 36 of the steam and condensate mixture, suctioned along with air from the condensate pipe 25, pipeline for supply of evacuated air and cooled condensate 37, tap 38, pipeline 39 for supplying overflow water back to the condensate pipe, check valve 40, solenoid valve (normally open) 41, unit of automatic control (AU2) of the operation of the vacuum liquid-ring pump and the solenoid valve, electrocontact manometer (PGS), tap 42, tap 43 for pre-filling with water for starting the pump and tap 51 for reducing rarification in the system.

The subsystem of premises heating includes: distribution steam pipe 44, pressure regulator "downstream" 45, steam tap 46, vertical spreading steam pipes 47, vertical condensate pipes 48, steam consumption valves 49, heating devices 50.

It should be specially noted that in order to achieve a satisfactory level of air-tightness of the entire system, it is necessary, after installation, to perform an obligatory testing of each of the subsystems for leakage with a test medium of 99% air+1% helium with an injection pressure of 6 kg/cm2. Control for leakages should be performed with a helium leak detector.

The vacuum steam heating system operates as follows: turning plug valve 4 into the "Closed" position, turning taps 6, 7, 18, 23, 33, 51 to the "Closed" position, turning taps 5, 28, 38, 46, 49 to the "Open" position. Connecting the flexible hose of the calibrated container with the softened water to tap 43, turning the tap to the "Open" position, pre-filling with water to the level of the overflow pipe connection in the air separator, then turning the tap to the "Closed" position, disconnecting the hose. Filling the steam boiler with water up to the upper level of the boiler water space according to level indicator 8 by opening taps 6, 5; bringing to the "Closed" position after filling.

Connecting the flexible hose of the calibrated container to tap 18, turning tap 18 to the "Open" position, filling with water to the bottom surface of the float according to level indicator 15, disconnecting the hose after filling and turning the tap to the "Closed" position. The condensate collection tank is located relative to the steam boiler level-wise so that the level of filling the tank with water corresponds to the water level in the steam boiler.

Switching on the unit automatic control (AU2) of vacuum liquid-ring pump 29 and solenoid valve 41, setting the vacuum indicator on the electrocontact manometer (PGS) at division with the value $P_B=-0.7$ kgf/cm$^2$, which corresponds to the absolute pressure $P_{abs.}=0.3$ kgf/cm$^2$.

They start the vacuum liquid-ring pump in the following way: Turning tap 33 to the "Open" position, filling the pump working space with water, switching on the pump. When the pump is switched on, solenoid valve 41 automatically moves to the "Closed" position, then the pumped air from the system through check valve 31 will be vented into the atmosphere. When the specified rarification in the system is reached, the pump automatically turns off, while valve 41 moves to the "Open" position by bypassing the condensate poured into the air separator back into the condensate pipe.

The steam boiler is started in the following sequence: plug valve 4 is turned in the "Open" position, the automation unit (AU1) activates burner device 3 in the boiler furnace, the steam which is formed during boiling is separated in the steam collector to a dryness degree of x =0.85, then through the pressure regulator adjusted on the bench with the "downstream" absolute pressure set-point of $P_{abs.}=0.9$ kgf/cm$^2$ is fed through distribution steam pipe 44 to the space heating subsystem, and specifically to heating devices 50, where, while condensing, it transfers most of the latent heat of steam generation to the device, and then to the premises with high heat transfer coefficient.

It should be specifically noted that when the vacuum liquid-ring pump does not operate, the cooled condensate fed to air separator 30 when the pump is running, through check valve 40 and the solenoid valve that is normally open is returned via pipeline 39 to central condensate pipe 25. Thus, a stable water balance in the system is ensured, i.e. a constant rated water level in the steam boiler is maintained without additional water make-up while the system is operating (no water deaeration unit is required). At an absolute pressure in the system of Pabs.=0.9 kgf/cm2, the steam temperature will be 96° C., which makes it possible to use metal-plastic and polyethylene pipes that are not corroded in the system.

The mechanical pumping condensate trap (condensate pump) that does not consume electrical energy, the intermittent vacuum liquid-ring pump that does not participate in the condensate pumping, since the condensate return and evacuation sub-systems are separated, increase the energy efficiency of the system.

The capacity of the condensate pump, depending on the pressure of the working gas (steam or compressed air), to transport the condensate to a higher level, allows the boiler to be arranged in basement variant, floor-mounted variant and roof variant, while the pumping condensate trap itself shall be arranged at least 200 mm below the central condensate pipe.

The feature of this heating system is that the system is divided into independently operating condensate return subsystems using the mechanical pumping condensate trap and the condensate collection tank with the float valve supplying the balancing steam to the tank with a cyclic small dosed supply of hot condensate to the boiler, and such a supply does not interrupt the process of stable water boiling. The capacity to force condensate to be lifted by the pumping condensate trap to a higher level allows the installation of a heat supply point in various versions. The vacuum-creation subsystem with automatic control of the creation of various rarification values makes it possible to generate a qualitative temperature control in the system in a rather wide range with a vacuum depth from PB=0.1 kgf/cm2 to PB=0.7 kgf/cm2, the temperature drop of the coolant in this rarification range is 96-68° C., which corresponds to the standards of sanitary and hygienic requirements.

The application of the scheme with the upper distribution of steam in the premises heating subsystem, with the same-direction movement of steam and condensate eliminates noise when the steam moves at high speed, wherein the heat transfer coefficient of the system is much increased in comparison with the conventional systems of water and atmospheric steam heating systems. Heat-performance analysis of the industrial design showed that the efficiency of this vacuum steam heating system is 89%, and energy saving is 38%.

The heating system is easy to maintain, safe to operate and provides reliable uninterrupted heat supply operation.

The invention claimed is:

1. A vacuum-steam heating system, the system comprising: a steam subsystem, a condensate return subsystem, a subsystem of vacuum-creation and qualitative control, a premise heating subsystem, wherein the subsystem of vacuum-creation and qualitative control is configured to regulate temperature of a coolant in the range of 96-68° C. through adjustment of vacuum depth in the system, wherein the steam subsystem comprises: a steam boiler (1), a steam collector (2), a furnace volume (3), a plug valve (4), a boiler water makeup valve (5), a soft water pipeline tap (6), a drain valve of steam subsystem (7), a boiler water level indicator (8), safety valves (9), a unit of automatic fuel supply and blocking (AU1) configured to be activated after interruption of an energy carrier supply, and a vacuum gauge (PG) configured for visual monitoring of pressure-rarification in the subsystem.

2. A vacuum-steam heating system, the system comprising: a steam subsystem, a condensate return subsystem, a subsystem of vacuum-creation and qualitative control, a premise heating subsystem, wherein the subsystem of vacuum-creation and qualitative control is configured to regulate temperature of a coolant in the range of 96-68° C. through adjustment of vacuum depth in the system, wherein the subsystem of vacuum-creation and qualitative control comprises: a vacuum liquid-ring pump (29), an air separator (30) equipped with a check valve (31), a pipeline of water supply for forming a water ring in the pump (32), a tap (33), a suction pipeline of air from the system (34), a check valve (35), a cooler (36) of the steam and condensate mixture, suctioned along with air from the condensate pipe (25), a pipeline for supply of evacuated air and cooled condensate (37), a tap (38), a pipeline (39) for supplying overflow water back to the condensate pipe, a check valve (40), a solenoid valve (41), a unit of automatic control (AU2) of the operation of the vacuum liquid-ring pump and the solenoid valve, an electrocontact manometer (PGS), a tap (42), a tap (43) for pre-filling with water for starting the pump, and a tap (51) for reducing rarification in the system.

* * * * *